United States Patent

Yamamoto et al.

[11] Patent Number: 5,881,090
[45] Date of Patent: Mar. 9, 1999

[54] QUARTZ USED IN SEMICONDUCTOR MANUFACTURING DEVICE, APPARATUS FOR MANUFACTURING THE QUARTZ, AND METHOD FOR MANUFACTURING THE SAME

[75] Inventors: Akihito Yamamoto, Yokkaichi; Hideyuki Kobayashi, Yokohama, both of Japan

[73] Assignee: Kabushiki Kaisha Toshiba, Kawasaki, Japan

[21] Appl. No.: 668,257

[22] Filed: Jun. 20, 1996

[30] Foreign Application Priority Data

Jun. 22, 1995 [JP] Japan .................................... 7-156127
Jun. 17, 1996 [JP] Japan .................................... 8-155380

[51] Int. Cl.$^6$ .......................... C03B 5/193; C03C 15/00
[52] U.S. Cl. .............................. 373/27; 373/109; 65/30.1
[58] Field of Search .................... 373/26–28, 109–124; 65/17, 18.4, 30.01, 3.12, 501, 157, 411, 30.2, 386, 413, 416; 423/263, 290, 344; 438/723; 501/54; 204/241; 219/494

[56] References Cited

U.S. PATENT DOCUMENTS

| | | |
|---|---|---|
| 4,098,595 | 7/1978 | Lenz et al. ................................. 65/17 |
| 4,462,970 | 7/1984 | Pastor et al. ............................. 423/263 |
| 4,701,316 | 10/1987 | Lester et al. ............................ 423/344 |
| 5,043,002 | 8/1991 | Dobbins et al. .......................... 65/3.12 |
| 5,076,902 | 12/1991 | Joshima et al. .......................... 204/241 |
| 5,096,479 | 3/1992 | Allen et al. ............................. 65/30.01 |
| 5,620,559 | 4/1997 | Kikuchi ................................... 438/723 |
| 5,668,067 | 9/1997 | Araujo et al. ............................. 501/54 |

*Primary Examiner*—Tu Ba Hoang
*Attorney, Agent, or Firm*—Finnegan, Henderson, Farabow, Garrett & Dunner, L.L.P.

[57] ABSTRACT

An inner chamber is arranged inside an outer chamber and stores quartz crystal powder. A space is defined between the inner chamber and the outer chamber, and an oxygen gas is introduced into that space. The quartz crystal powder is supplied from the inner chamber into a burner section, together with the oxygen gas. The burner section is also supplied with a flammable gas from a gas control device. The flammable gas contains an $NH_3$ gas. The heat produced by the combustion of the flammable and oxygen gases fuses the quartz crystal powder supplied from the inner chamber into the burner section. As a result, quartz containing nitrogen is produced. The nitrogen is contained in the fused quartz in an amount which is expressed as 1 to 10% by molar ratio.

17 Claims, 3 Drawing Sheets

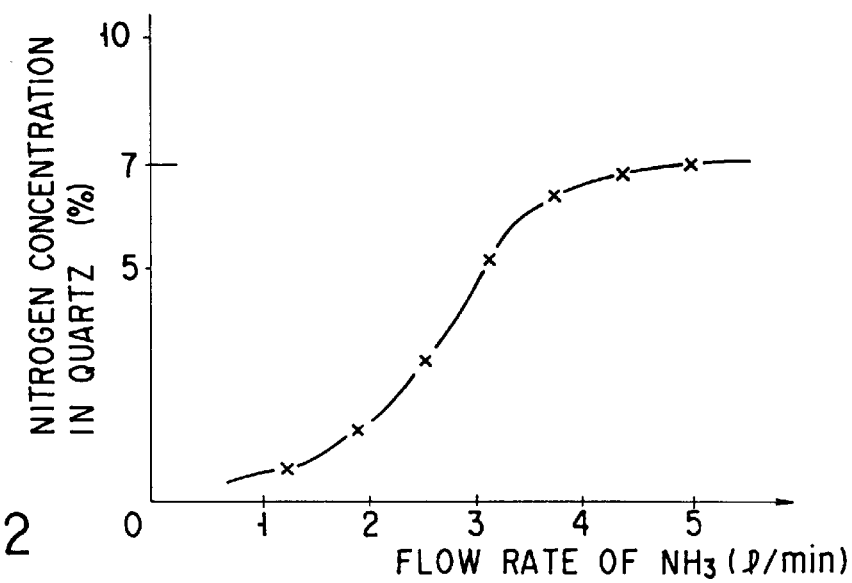
F I G. 2
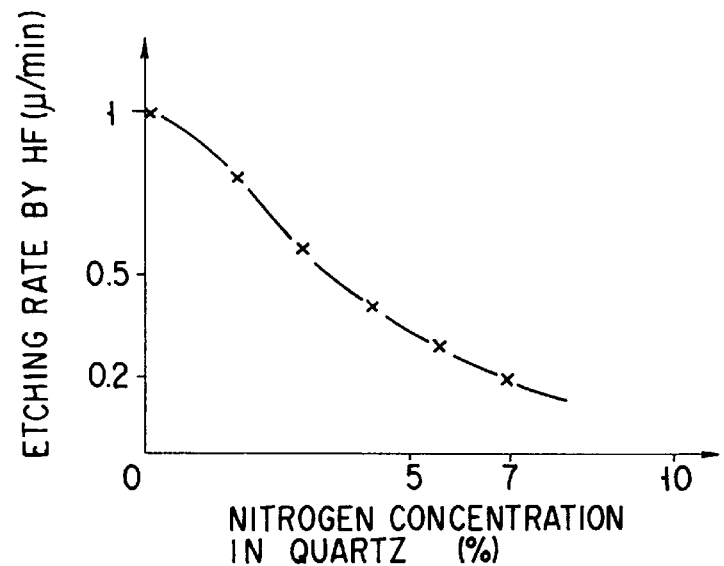
F I G. 3
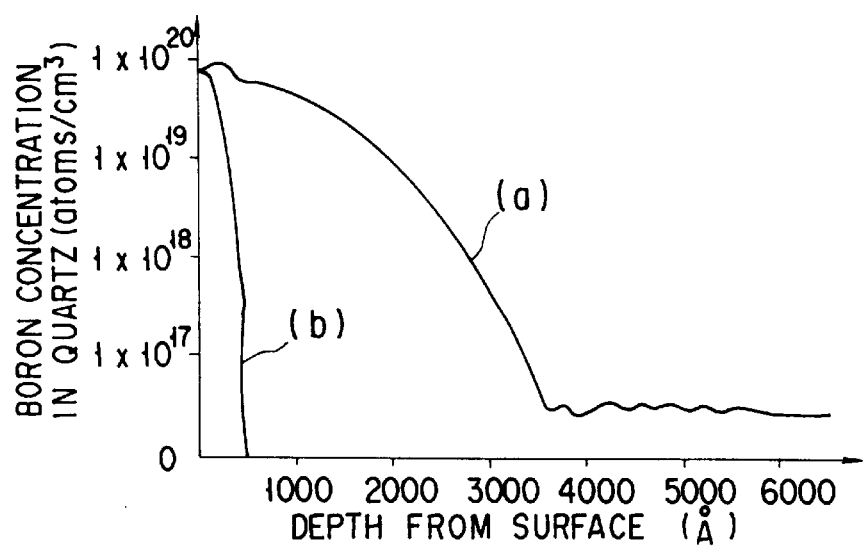
F I G. 4

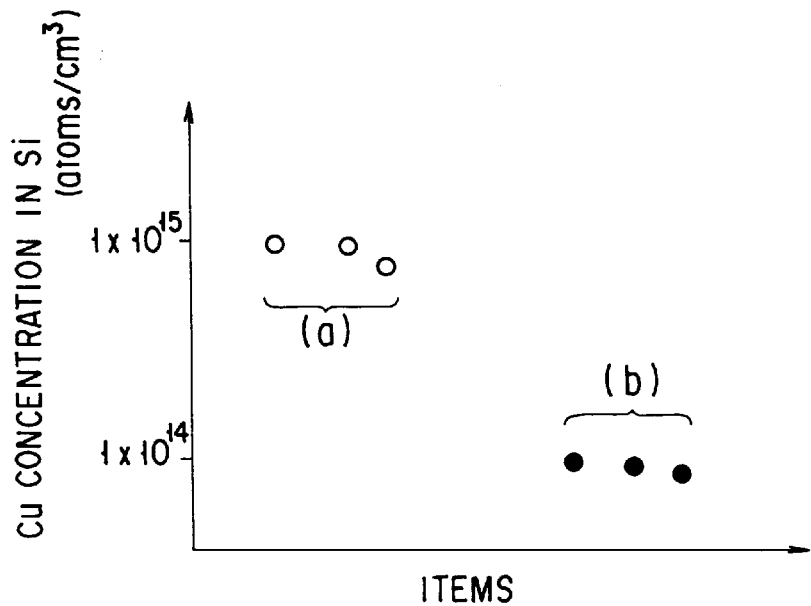
F I G. 5
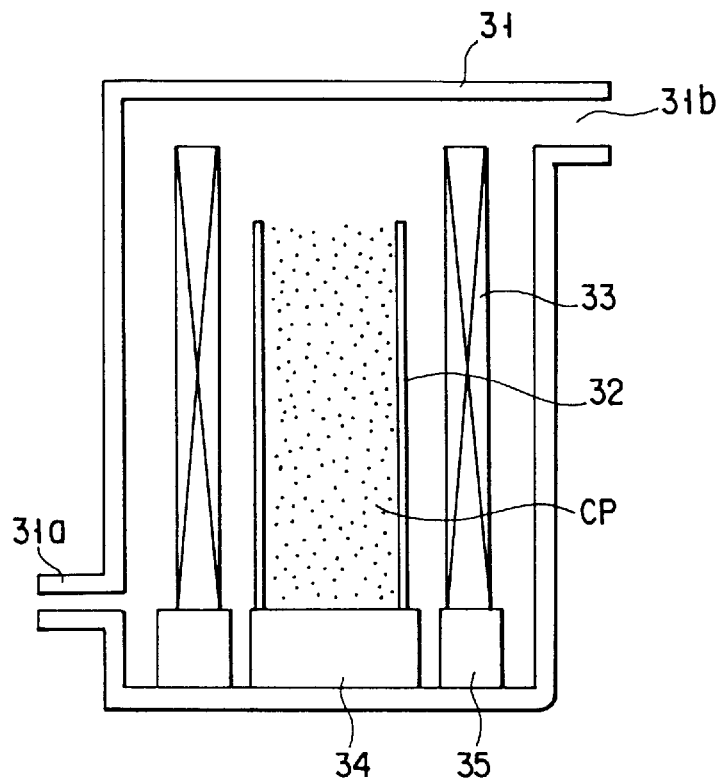
F I G. 6

QUARTZ USED IN SEMICONDUCTOR MANUFACTURING DEVICE, APPARATUS FOR MANUFACTURING THE QUARTZ, AND METHOD FOR MANUFACTURING THE SAME

BACKGROUND OF THE INVENTION

1. Field of the Invention

The present invention relates to quartz with which to form a chamber, susceptor, or other jigs used for the manufacture of semiconductors, an apparatus for manufacturing the quartz, and a method for manufacturing the quartz.

2. Description of the Related Art

In general, fused quartz is utilized for the manufacture of jigs which have to be formed of quartz. The fused quartz is obtained by fusing quartz crystal powder by means of a burner or an electric furnace. Where the burner is employed, the quartz powder is fused by the oxyhydrogen flame in the atmosphere containing $H_2$ and $O_2$. Where the electric furnace is employed, the quartz crystal powder is fused in the vacuum atmosphere by the heat generated by the heater. However, the fused quartz obtained in these processes has the following drawbacks:

Although quartz is a material which cannot be easily softened, it may deform when heated at a temperature higher than 1,100° C. Therefore, it is not desired to use quartz as the material of jigs which are subjected to high-temperature processing, such as high-temperature annealing.

In addition, quartz permits easy permeation of a metal which has a high diffusion coefficient in quartz, such as Cu or Ni. That is, quartz cannot be used for forming a chamber which is used for treating such metals.

Further, particles of boron (B) or aluminum (Al) may easily attach to quartz. If a chamber having such an impurity is used for a long time, the impurity may be emitted from the quartz constituting the chamber, resulting in contamination of semiconductor substrates.

If quartz is used for forming a chamber or a susceptor of a CVD apparatus which forms films by use of chemical vapor phase growth, the films attaching to the susceptor or the inner wall of the chamber have to be removed regularly. During the cleaning process for this removal, the chamber or susceptor formed of quartz may be damaged.

When a film to which a large amount of phosphorus (P) or B is added by use of vapor phase growth is formed on a wafer, the wafer has to be held by a jig. If this jig is formed of quartz, it is likely that the jigs will be damaged by the diffusion of P or B. The jig may crack when the temperature for treatment is greatly raised or lowered.

SUMMARY OF THE INVENTION

Accordingly, an object of the present invention is to provide quartz suitable for use in semiconductors, and an apparatus and method for forming the quartz.

To attain this object, the present invention provides:

quartz used in a semiconductor manufacturing device, comprising:
fused quartz; and
nitrogen added to the fused quartz,
the nitrogen being contained in the fused quartz in an amount which is expressed as 1 to 10% by molar ratio with respect to SiO.

The present invention also provides an apparatus for manufacturing quartz used in a semiconductor manufacturing device, comprising:

fusing means for fusing quartz crystal powder to obtain fused quartz; and supply means for supplying a gas containing nitrogen to the fusing means, the nitrogen being introduced into the fused quartz.

The present invention further provides a method for manufacturing quartz used in a semiconductor manufacturing device, comprising the steps of:

producing an oxyhydrogen flame including nitrogen; and fusing quartz crystal powder with the oxyhydrogen flame, so as to obtain fused quartz in which nitrogen is contained.

According to the present invention, fused quartz is nitrified. The quartz containing nitrogen is hard to deform even at high temperature, and does not allow permeation of a metal. In addition to this advantage, the quartz containing nitrogen is not much damaged and is improved in mechanical strength. It is desirable to use the quartz as the material of a chamber or jig employed for manufacturing semiconductor devices.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a graph showing the characteristics of nitrogen-containing quartz according to the present invention.

FIG. 3 is a graph showing the characteristics of nitrogen-containing quartz according to the present invention, and illustrates the relationship between the nitrogen concentration and the etching rate.

FIG. 4 is a graph showing the characteristics which the nitrogen-containing quartz according to the present invention has for B, the characteristics being indicated in comparison with those of the conventional fused quartz.

FIG. 5 is a graph showing the characteristics which the nitrogen-containing quartz according to the present invention has for Cu, the characteristics being indicated in comparison with those of the conventional fused quartz.

FIG. 6 shows the second embodiment of the present invention, and is a schematic diagram of an apparatus employing an electric oven.

DETAILED DESCRIPTION OF THE PREFERRED EMBODIMENTS

Figure 1:
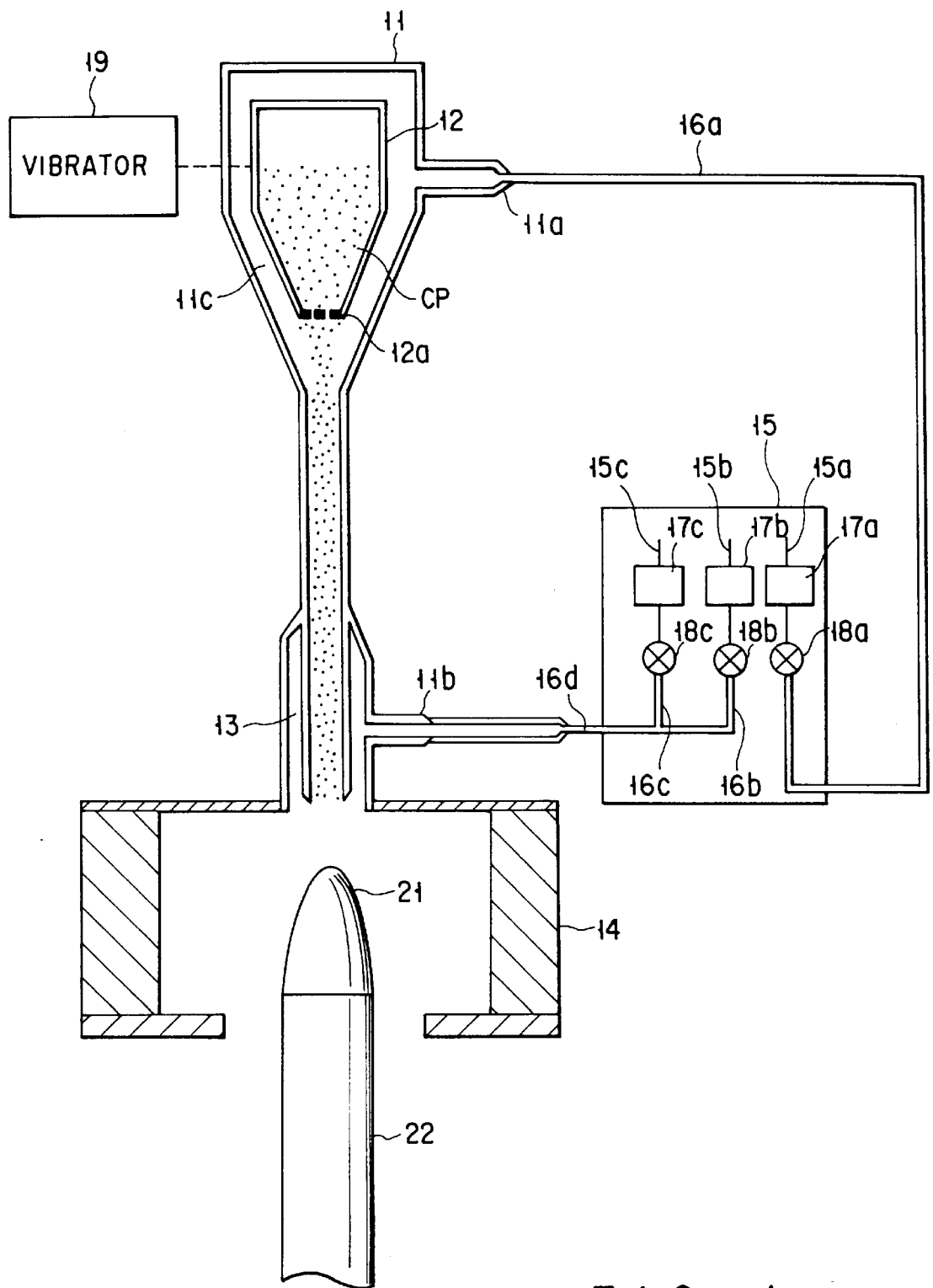
FIG. 1 shows the first embodiment of the present invention and is a schematic diagram of an apparatus employing a burner.

Embodiments of the present invention will now be described with reference to the accompanying drawings.

FIG. 1 shows an oxyhydrogen flame type quartz-fusing device according to the present invention. The quartz fusing device fuses quartz crystal powder by means of an oxyhydrogen flame and produces fused quartz. The device comprises: an outer chamber 11; an inner chamber 12; a burner section 13; a heat insulating chamber 14; and a gas control device 15.

The outer chamber 11 is formed of a metal, for example. It is located above the heat insulating chamber 14 and connected thereto through the burner section 13. The inner chamber 12 is formed of a metal, for example, and arranged in the upper region of the outer chamber 11. A space 11c is defined between the outer chamber 11 and the inner chamber 12. The outer chamber 11 is provided with an oxygen supply port 11a which communicates with the space 11c, and an oxygen gas is supplied into the space 11C through the oxygen supply port 11a. The oxygen supply port 11a is connected to the first end of pipe 16a, and the second end of this pipe 16a is connected to the gas control device 15.

A net 12a is located at the bottom of the inner chamber 12. Quartz crystal powder is contained inside the inner chamber 12a. A vibrator 19 is arranged outside the outer chamber 11, and is connected to the inner chamber 12. The inner chamber 12 is vibrated by means of this vibrator 19, and the vibration causes the quartz crystal powder CP to drop into the burner section 13 through the net 12a.

The burner section 13 is located under the outer chamber 11 and on the radially outer side thereof. The outer chamber 11 and the burner section 13 communicate with each other through the heat insulating chamber 14. The burner section 13 is provided with a flammable gas supply port 11b through which a flammable gas is introduced. The flammable gas supply port 11b is connected to one end of pipe 16d, and the other end of this pipe 16d is connected to the gas control device 15.

The gas control device 15 includes gas sources 15a, 15b and 15c, from which an oxygen gas, a hydrogen gas, a $NH_3$ gas are supplied, respectively. Mass flow controllers 17a, 17b and 17c are connected to gas sources 15a, 15b and 15c, respectively, for the control of gas flow rates. Valves 18a, 18b and 18c are connected to mass flow controllers 17a, 17b and 17c, respectively. The second end of pipe 16a is connected to valve 18a, and the first ends of pipes 16b and 16c are connected to valves 18b and 18c, respectively. The second ends of pipes 16b and 16c are connected to the second end of pipe 16d. The oxygen gas supplied from gas source 15a passes through mass flow controller 17a, valve 18a, and pipe 16a and flows into the oxygen supply port 11a. The hydrogen gas supplied from gas source 15b passes through mass flow controller 17b, valve 18b and pipe 16b and flows into pipe 16d, while the $NH_3$ gas passes through mass flow controller 17c, valve 18c and pipe 16c and flows into pipe 16d. In pipe 16d, the hydrogen gas and the $NH_3$ gas are mixed together, and then supplied into the flammable gas supply port 11b.

In the burner section 13, the flammable gas introduced from the gas control device 15 by way of the flammable gas supply port 11b and the oxygen gas supplied by way of the oxygen supply port 11a, are mixed together and burned, and the quartz crystal powder CP supplied from the inner chamber 12 is fused by utilization of the heat of the oxyhydrogen flame produced by the combustion. The heat insulating chamber 14 is used for cooling the fused quartz 21 fused in the burner section 13. As the material gas, not only the $NH_3$ gas mentioned above but also an $NF_3$ gas or an $N_2O$ gas may be used.

In the quartz fusing device of the above structure, the burner section 13 is supplied with the flammable gas from the gas control device 15 and is further supplied with the oxygen gas from the outer chamber 11. These gases are burned in the burner section 13. The quartz crystal powder CP supplied into the burner section 13 from the internal chamber 12 is fused by the oxyhydrogen flame, thus obtaining fused quartz 21. The fused quartz 21 was cooled and hardened in the heat insulating chamber 14, thus forming a columnar quartz 22 which contains nitrogen.

The concentration of the nitrogen in the quartz 22 is determined by adjusting the flow rate of the $NH_3$ gas contained in the flammable gas supplied from the gas control device 15.

FIG. 2 shows the relationships between the concentration of the nitrogen contained in the nitrogen-added quartz 22 and the flow rate of the $NH_3$ gas. As is apparent from FIG. 2, the concentration of the nitrogen contained in the nitrogen-added quartz 22 increases in accordance with an increase in the flow rate of the $NH_3$ gas. That is, the concentration of the nitrogen in the quartz 22 can be adjusted by controlling the flow rate of the $NH_3$ gas. The concentration of the nitrogen contained in the nitrogen-added quartz 22 is about 7%, when the flow rate of the $NH_3$ gas is 5 liters/min, and the molar ratio of N is expressed by:

$$[N]/([Si]+[O]+[N])\times 100\%$$

The advantage will become more and more marked in accordance with an increase in the concentration of the nitrogen in the quartz 22. In the device shown in FIG. 1, the concentration of the nitrogen contained in the quartz can be controlled within the range which is expressed as 1 to 10% by molar ratio by appropriately adjusting the amount of quartz crystal powder supplied to the burner section 13 and by bringing the quartz crystal powder into tight contact with the oxyhydrogen flame.

FIG. 3 shows the relationships between the concentration of the nitrogen contained in the nitrogen-added quartz 22 and the etching rate using hydrofluoric acid (HF). As is apparent from FIG. 3, the etching rate decreases in accordance with an increase in the concentration of the nitrogen contained in the nitrogen-added quartz 22. In other words, the higher the nitrogen concentration in the quartz 22, the more resistant the quartz 22 becomes to the etching by HF. If, in FIG. 3, the concentration of the nitrogen in the quartz 22 is about 7%, as mentioned above, the etching rate is 0.2 $\mu$m/min.

Accordingly, where nitrogen-added quartz 22 is used for forming a chamber or a jig (e.g., a susceptor) of a CVD apparatus which forms a film by use of chemical vapor phase growth, they are prevented from being damaged even when they are cleaned with HF or the like.

FIG. 4 shows the concentrations of boron in a sample and how the boron is distributed in the depth direction of the sample. To be more specific, the boron concentrations and boron distribution shown in FIG. 4 are those of a sample which was obtained by depositing a BSG (boron silicate glass) film over quartz and annealing the resultant structure for about 10 hours at a temperature of 1,000° C. for example.

In FIG. 4, the characteristics indicate d by (a) are those of conventional fused quartz, and the characteristics indicated by (b) are those of nitrogen-added quartz 22 mentioned above. As is apparent from FIG. 4, the nitrogen-added quartz 22 is not very related to the boron concentration in quartz; in other words, the nitrogen-added quartz 22 suppresses permeation of boron.

As described above, boron degrades the mechanical strength of quartz. However, since the nitrogen-added quartz 22 suppresses permeation of an impurity, it is suitable to use the nitrogen-added quartz 22 as the material of a jig of a CVD apparatus. Where a jig of a CVD apparatus is formed of nitrogen-added quartz 22, it is not easily damaged by the diffusion of phosphor or boron. Hence, the jig is prevented from cracking when the temperature is raised.

FIG. 5 shows the Cu concentrations in a silicon substrate which were obtained by providing a Cu coating over a silicon substrate, with quartz interposed, and by subsequently subjecting the resultant structure to heat treatment. In FIG. 5, the characteristics indicated by (a) are those of a case where the conventional fused quartz is used, and the characteristics indicated by (b) are those of a case where nitrogen-added quartz 22 mentioned above is used. In each case, the characteristics of three samples are indicated. As is apparent from FIG. 5, the Cu concentrations in nitrogen-added quartz 22 are very low in comparison with those in the conventional fused quartz. This is attributable to the fact that the addition of nitrogen into quartz serves to suppress the diffusion of Cu.

The nitrogen-added quartz 22 serves to suppress the diffusion of a metal, such as Cu. This being so, it is advantageous to use the nitrogen-added quartz 22 as the material of a chamber or a jig which is used for treating Cu, Ni, or metal whose diffusion coefficient in quartz is large. Where the chamber or jig is formed of the nitrogen-added quartz 22, it is not permeable to a metal.

In addition, the addition of nitrogen to quartz raises the softening temperature, so that the chamber or jig formed of the nitrogen-added quartz 22 is not easily softened. Further, the nitrogen-added quartz 22 is as clean and pure as possible, since an impurity does not easily attach to it. Even in the case where the nitrogen-added quartz 22 is used for a long time as the chamber used for treating an impurity, such as B or Al, the impurity does not radiate from the quartz, and the semiconductor devices are prevented from being contaminated.

The above embodiment was explained, with a quartz-fusing device of an oxyhydrogen flame type being taken by way of example. Needless to say, the present invention is not limited to this example. For example, the present invention can be applied to a quartz-fusing device of an electric furnace type.

FIG. 6 is a schematic diagram showing a quartz-fusing device of an electric furnace type according to the second embodiment of the present invention. The quartz-fusing device produces fused quartz from quartz crystal powder by means of a pressure-reduced electric furnace.

Referring to FIG. 6, a chamber 31 contains a case 32 for storing quartz crystal powder CP, and a heater 33 arranged around the case 32. The chamber 31 has a gas supply port 31a and a gas exhaust port 31b. The case 32 is coupled to a sample table 34, which in turn is coupled to the bottom of the chamber 31. In this manner, the case 32 is secured to the bottom of the chamber 31. Likewise, the heater 33 is coupled to a support 35 located around the sample plate 34, and the support 35 is coupled to the bottom of the chamber 31. In this manner, the heater 33 is secured to the bottom of the bottom of the chamber 31 as well.

In the quartz-fusing device of the above structure, the gas in the chamber 31 is exhausted from the gas exhaust port 31b, until the pressure in the chamber 31 becomes a predetermined value. In this pressure-reduced state, a nitrogen-containing gas, such as $NH_3$ or $N_2O$, is supplied into the chamber 31 by way of the gas supply port 31a. Simultaneous with this, the heater 33 is turned on to raise the temperature of the case 32 to a predetermined temperature. In this manner, the quartz crystal powder CP inside the case 32 is fused.

Like the aforesaid quartz-fusing device of the oxyhydrogen flame type, the quartz-fusing device of the second embodiment can produce nitrogen-added quartz whose nitrogen concentration is controlled in accordance with the flow rate of the gas that contains nitrogen.

In ordinary processing performed in a vacuum atmosphere, a carbon-based material can be used as the case 32. In the case of this embodiment, however, processing is effected in an $NH_3$ gas atmosphere, and the reaction between the $NH_3$ gas and the carbon-based material has to be avoided. In the embodiment, therefore, the case 32 is made of silicon carbide (SiC) or the like.

The present invention applicable to a case where quartz is formed on a semiconductor wafer by vapor phase growth. In this case, a nitride-based gas, such as $NH_3$ or $N_2O$, is added to a reactant gas used for forming quartz (e.g., dichlo-silane $[SiH_2Cl_2]$). Let it be assumed that a vapor phase growth is performed on a semiconductor wafer, with the flow rate of $NH_3$ kept as 2 liters/min, that of the $SiH_2Cl_2$ as 0.2 liters/min, that of $N_2O$ as 3 liters/min, the temperature as 800° C. and the pressure as 1 Torr. In this case, an oxynitride whose nitride concentration is expressed by a molar ratio of 30% ($[N]/([Si]+[O]+[N])$). The nitride concentration can be controlled by changing the flow rates of $N_2O$ and $NH_3$. If the nitride concentration is too high, the film will increase in stress and may easily separate from the wafer. Therefore, the nitride concentration has to be controlled not to become too high. It should be noted that a film formed by vapor phase growth is coarse in crystalline structure. It is therefore desired that the film be subjected to heat treatment at a temperature higher than 1,000° C., so that the film can have a fine crystalline structure.

In the present invention, the base material is in no way limited to a semiconductor wafer. For example, nitride-added quartz may be grown on ordinary quartz, and the resultant quartz structure may be used in a semiconductor device. The present invention is applicable to the manufacture of such a quartz structure.

In the present invention, the nitrogen need not be added to quartz when the crystal powder of the quartz is fused. For example, fused quartz may be prepared without adding nitrogen thereto, and the fused quartz in this state may be heat-treated in an atmosphere containing $NH_3$ or $H_2O$ at a temperature of 900° C. or higher. Nitrogen-added quartz can be obtained in this case as well. The nitrogen-added quartz formed in this process is expected to have the same advantages as the nitrogen-added quartz formed in the first and second embodiments of the present invention.

Needless to say, the present invention can be modified in various manners without departing from the spirit and scope of the present invention, when it is reduced to practice.

What is claimed is:

1. An apparatus for manufacturing quartz for use in a semiconductor manufacturing system comprising:

an outer chamber;

an inner chamber arranged inside the outer chamber and having an opening in a bottom section thereof, said inner chamber and said outer chamber defining a space therebetween, said inner chamber storing quartz crystal powder which is made to drop into the outer chamber by way of the opening;

first supply means for supplying oxygen gas into the space, said oxygen gas being supplied to a lower region of the outer chamber from the space;

a burner arranged in the lower region of the outer chamber; and second supply means for supplying hydrogen gas and a raw material gas including a flammable or flame sustainable nitrogen compound into a region of the burner, said burner producing an oxyhydrogen flame from the oxygen gas which is supplied to the lower region of the outer chamber along with the quartz crystal powder and from the hydrogen gas supplied by the second supply means, so that the quartz crystal powder dropping into the lower region of the outer chamber is fused to thereby produce fused quartz, said fused quartz containing nitrogen from the raw material gas.

2. The apparatus according to claim 1, wherein said nitrogen is contained in the fused quartz in an amount which is expressed as 1 to 10% by molar ratio.

3. A quartz product for use in a semiconductor-manufacturing device, having a nitrogen concentration in the quartz in a molar ratio of 1 to 10%.

4. A method of manufacturing quartz for use in a semiconductor-manufacturing device, comprising:

producing fused quartz from quartz crystal powder by adding nitrogen to fused quartz by introducing a nitrogen-containing gas into a region of an oxyhydrogen flame used for fusing the quartz crystal powder, wherein the fused quartz has a nitrogen concentration expressed as a molar ratio of 1 to 10%.

5. A method for manufacturing quartz for use in a semiconductor-manufacturing device, comprising:

producing fused quartz from quartz crystal powder by adding nitrogen to the fused quartz by producing a nitrogen-containing gaseous atmosphere in an electric furnace used for fusing the quartz crystal powder, wherein the fused quartz has a nitrogen concentration expressed as a molar ratio of 1 to 10%.

6. An apparatus for manufacturing quartz for use in a semiconductor-manufacturing system, comprising:

fusing means for fusing quartz crystal powder to produce fused quartz; and supply means for supplying a gas containing a flammable or flame sustainable nitrogen compound to the fusing means, wherein nitrogen is introduced into the fused quartz.

7. The apparatus according to claim 6, wherein said nitrogen is contained in the fused quartz in an amount which is expressed as 1 to 10% by molar ratio.

8. The apparatus according to claim 6, wherein said fusing means includes a burner for generating an oxyhydrogen flame, and said gas containing the flammable or flame sustainable nitrogen compound is supplied to a region of the burner.

9. The apparatus according to claim 8, wherein the flammable nitrogen compound comprises $NH_3$ gas, and the flame sustainable nitrogen compound comprises one gas selected from the group consisting of $NF_3$ gas, $N_2O$ gas and NO gas.

10. The apparatus according to claim 6, wherein said fusing means includes a heater.

11. A method of manufacturing quartz for use in a semiconductor-manufacturing device, comprising:

forming the quartz from a reactant gas by vapor phase growth in the presence of a nitrogen containing gas, wherein said quartz has a nitrogen concentration expressed as a molar ratio of 1 to 10%.

12. A method of manufacturing quartz for use in a semiconductor-manufacturing device, comprising:

adding nitrogen to the quartz by heat treating the quartz in a nitrogen-containing gas, wherein the quartz has a nitrogen concentration expressed as a molar ratio of 1 to 10%.

13. An apparatus for manufacturing quartz for use in a semiconductor manufacturing system, comprising:

a chamber;

a container arranged in the chamber and storing quartz crystal powder therein;

a heater for heating the container so that the quartz crystal powder is fused to thereby produce fused quartz; and supply means for supplying a raw material gas containing a flammable or flame sustainable nitrogen compound into the chamber, said fused quartz containing nitrogen from the raw material gas.

14. The apparatus according to claim 13, wherein said nitrogen is contained in the fused quartz in an amount which is expressed as 1 to 10% by molar ratio.

15. The apparatus according to claim 13, wherein said container is made of SiC.

16. A method for manufacturing quartz for use in a semiconductor manufacturing apparatus, comprising:

producing an oxyhydrogen flame including at least a chemically active nitrogen compound; and fusing quartz crystal powder by means of the oxyhydrogen flame, to thereby form fused quartz containing nitrogen.

17. The method according to claim 16, wherein said nitrogen is contained in the fused quartz in an amount which is expressed as 1 to 10% by molar ratio.

* * * * *